Patented Nov. 10, 1942

2,301,668

UNITED STATES PATENT OFFICE 2,301,668

PRODUCTION OF POLYMERIZATION OR CONDENSATION PRODUCTS FROM UNSATURATED HYDROCARBONS

Mathias Pier, Heidelberg, and Friedrich Christmann, Ludwigshafen-on-the-Rhine, Germany; vested in the Alien Property Custodian No Drawing. Application June 9, 1938, Serial No. 212,688. In Germany June 16, 1937

8 Claims. (Cl. 196—78)

The present invention relates to the improvements in the manufacture and production of polymerization or condensation products from unsaturated hydrocarbons.

It is known that a great variety of products can be obtained by polymerization or condensation of unsaturated hydrocarbons. Thus for example valuable motor fuels or highly viscous lubricating oils can be prepared in the said manner.

We have now found that a new kind of product of considerably higher molecular weight than those mentioned can be obtained by converting high molecular weight carbonaceous substances rich in hydrogen which contain at least about 15 grams of hydrogen for each 100 grams of carbon into products rich in unsaturated hydrocarbons and then condensing the latter together with hydrocarbons containing more than one double linkage or one or more triple linkages under mild conditions. The expression "condensing" shall mean the forming of high molecular products by treating unsaturated hydrocarbons with polymerization or condensation agents.

In order to obtain good products it is necessary to start from high molecular weight carbonaceous substances rich in hydrogen. It is only in this case that a suitable hydrocarbon mixture, which contains mainly olefines with more than 4 carbon atoms and is free from large amounts of by-products such as are formed by splitting the usual gas oils to unsaturated hydrocarbons, as for example partially hydrogenated aromatic hydrocarbons, is obtained. By-products of the said kind influence the condensation of unsaturated hydrocarbons in such manner that substances similar to lubricating oil and having relatively low molecular weight are formed.

Initial materials rich in hydrogen of the said kind are for example hard or soft paraffin wax, ceresine, ozokerite, montan wax, paraffinic petroleum residues, crude petroleum jelly or crude lubricating oils rich in hydrogen. The products obtained by the reduction of carbon monoxide at atmospheric or increased pressure, which may be of paraffinic or also olefinic nature, or the products obtained by condensation or polymerization of low molecular weight olefines, such as are contained for example in cracking gases, or by the voltolization of hydrocarbons, are also very suitable. The products rich in hydrogen obtained from coals, tars or mixed-basic or paraffinic-basic petroleums by destructive hydrogenation may also serve as initial materials.

For the production of unsaturated hydrocarbons, the said initial materials are cracked or dehydrogenated in known manner. It is usual to work above 350° C., if necessary in the presence of splitting catalysts, as for example bleaching earths which are preferably pretreated with acids, as for example hydrofluoric acid, alumina or metals of the 6th group or their compounds. The dehydrogenation may also be carried out with the addition of sulphur or oxygen or gases containing oxygen.

A specially advantageous method of obtaining suitable unsaturated hydrocarbons consists in introducing halogen, sulphur or oxygen into the initial materials, preferably in the presence of catalysts, such as iodine or antimony trichloride, and then splitting them off again, for example in the form of hydrogen compounds. This splitting off is preferably effected at elevated temperature, as for example from 100° to 350° C., and in the presence of condensing agents having a mild action, such as bleaching earths, boric acid, oxalic acid or complex acids, as for example ansolvo acids or their salts. The split off halogen hydrides may also act as mild condensing agents.

The unsaturated hydrocarbons prepared in the said manner, which mainly contain more than 4 carbon atoms in the molecule, are mixed with diolefines, advantageously of low molecular weight, as for example allene, butadiene, chlorbutadiene, isoprene, diallyl, piperylene, conylene or compounds having triple linkages, as for example allylene, crotonylene or vinylacetylene or mixtures containing the same in an amount of from 20 to 60 per cent or more. Mixtures of suitable olefines with diolefines may also be directly prepared from the said initial materials rich in hydrogen by splitting them at high temperatures, as for example above 470°, preferably at from 500° to 700° C., or by introducing a larger amount of halogen, as for example from 15 to 25 per cent or more into the initial materials and splitting it off again.

The mixtures of olefines and diolefines or compounds having triple linkages thus prepared are condensed in the presence of chlorinated hydrocarbons, as for example carbon tetrachloride.

The unsaturated hydrocarbons may also have added to them unsaturated compounds containing oxygen, as for example unsaturated aldehydes, ketones, alcohols, acids or acid anhydrides, such as acrolein, crotonaldehyde, phorone, mesityl oxide or furane, geraniol, crotonic acid or maleic anhydride prior to the condensation, or generally such substances (other than diolefines or compounds having triple linkages) which may be polymerised under the same conditions for instance vinyl-compounds as vinylesters, vinylethers, vinylchloride, vinylcarbazol or isobutylene, indene, cumaron or mixtures of these substances.

As condensing agent there may be used with advantage boron fluoride, in particular in an amount of from 1 to 10, advantageously from 1 to 5, per cent. Small amounts of metal halides, such as aluminum chloride, zinc chloride, ferric chloride or titanium chloride may also be used. It is preferable to add substances which retard the reaction, such as zinc oxide or ammonia, to the said condensing agents.

The condensation may also be carried out in the presence of small amounts, as for example from 1 to 20 per cent with reference to the initial mixture, of cyclic compounds which may if desired also contain oxygen, nitrogen or sulphur. As such there may be mentioned for example benzene, toluene, xylene, naphthalene, fluorene, anthracene, pyrene, phenol or phenol ethers, as for example guaiacol. Completely hydrogenated cyclic compounds, as for example decahydronaphthalene or fractions containing the same, which are formed for example in the destructive hydrogenation of mineral coal, are especially suitable.

By working in the said manner at temperatures between 10 and 150° C., preferably between 30 and 80° C., strongly unsaturated oils having viscous properties, a molecular weight of more than 450 and an iodine value of from about 100 to 160 are obtained which may be used as drying oils, for example as a substitute for vegetable drying oils or in admixture with the same. In thin layers they dry in the air to form hard elastic films. The drying process may be accelerated, by heating, if necessary with an addition of siccatives, such as oxides, acetates or borates of lead, manganese or cobalt.

By carrying out the condensation at temperatures below 10° C. for instance from −10° to −40° C. or lower, elastic plastic masses are obtained which may be used as coating, impregnating or insulating material.

The following examples will further illustrate the nature of this invention but the invention is not restricted to these examples. The parts are by weight.

Example 1

150 parts of liquid paraffin cracking products which boil between 50° and 280° C. and have been obtained by cracking at about 500° C. a paraffin wax obtained by the destructive hydrogenation of Mid-German brown coal tar are diluted with 150 parts of carbon tetrachloride. Into this mixture there are led at a temperature between 40° and 50° C. in a slow gas stream 150 parts of butadiene during the course of 7 hours, small amounts of boron fluoride being added at the same time.

By far the greater part of the butadiene is absorbed. The reaction mixture, after completion of the reaction, is subjected to distillation, whereby the carbon tetrachloride used, 45 parts of middle oil and the dissolved boron fluoride pass over. The distillation residue consists of 240 parts of a viscous oil having an iodine value of 130 and a mean molecular weight of 600 which has strong drying properties.

The same result is obtained by using isoprene instead of butadiene.

Example 2

Hydrocarbons with a boiling point above 280° C., obtained by the reaction of carbon monoxide with hydrogen, are cracked at a temperature of between 500 and 520° C. with the insufficiently cracked constituents being repeatedly recirculated. 550 parts of the cracking products boiling between 50 and 280° C. are dissolved in 1000 parts of ethylene chloride. Into this solution 450 parts of butadiene are introduced in about 8 hours at a temperature of 50° C., while small amounts of boron fluoride are added at the same time.

From the product, by distillation up to about 250° C., ethylene chloride and about 30 parts of middle oil are removed. The residue consists of 940 parts of a viscous oil which may be used as a substitute for linseed oil for the production of putties or knifing and painting compositions.

Example 3

100 parts of a hydrocarbon mixture obtained from solid paraffin by cracking at 500° C. and 100 parts of butadiene are treated with boron fluoride at a temperature of 40° below 0° C. in the presence of 100 parts of carbon tetrachloride. When the polymerization is terminated the carbon tetrachloride is distilled off. The residue is an elastic rubber-like composition.

What we claim is:

1. A process for the production of high molecular weight substances by condensation of unsaturated hydrocarbons which comprises condensing under mild conditions at temperatures below 150° C. in the presence of a chlorinated hydrocarbon olefine hydrocarbons obtained by converting high molecular weight carbonaceous substances rich in hydrogen which contain at least 15 grams of hydrogen for each 100 grams of carbon into products rich in unsaturated hydrocarbons, together with hydrocarbons selected from the group consisting of hydrocarbons containing more than one double linkage and hydrocarbons containing at least one triple linkage.

2. In the process as claimed in claim 1 the employment of olefine hydrocarbons which have been obtained by converting the said high molecular weight carbonaceous substances rich in hydrogen into products rich in unsaturated hydrocarbons by destructive treatment of the said substances rich in hydrogen at elevated temperature.

3. In the process as claimed in claim 1 the employment of olefine hydrocarbons which have been obtained by converting the said high molecular weight carbonaceous substances rich in hydrogen into products rich in unsaturated hydrocarbons by cracking the said substances rich in hydrogen.

4. In the process as claimed in claim 1 the employment of olefine hydrocarbons which have been obtained by converting the said high molecular weight carbonaceous substances rich in hydrogen into products rich in unsaturated hydrocarbons by dehydrogenating the said substances rich in hydrogen.

5. In the process as claimed in claim 1 the employment of olefine hydrocarbons which have been obtained by converting the said high molecular weight carbonaceous substances rich in hydrogen into products rich in unsaturated hydrocarbons by destructive treatment of the said substances rich in hydrogen at elevated temperature after introducing at least one element selected from the group, consisting of halogen, sulphur and oxygen into the initial material, thus splitting up a substance selected from the group consisting of halogen, sulphur, oxygen and their hydrogen compounds.

6. In the process as claimed in claim 1 the employment of olefine hydrocarbons which have been obtained by converting the said high molecular weight carbonaceous substances rich in hydrogen into products rich in unsaturated hydrocarbons by destructive treatment of the said substances rich in hydrogen under such strong conditions that in addition to olefines diolefines are produced.

7. A process for the production of high molecular weight substances having drying oil properties which comprises condensing a mixture of butadiene and volatile olefine hydrocarbons obtained by converting paraffin wax into products rich in unsaturated hydrocarbons, at a temperature below 150° C., and in the presence of a chlorinated hydrocarbon.

8. The process as defined in claim 7, wherein said olefine hydrocarbons boil between 50–280° C. and wherein said chlorinated hydrocarbon is an aliphatic chlorinated hydrocarbon.

MATHIAS PIER.
FRIEDRICH CHRISTMANN.